United States Patent [19]
Snead

[11] 3,727,269
[45] Apr. 17, 1973

[54] FISH HOLDER

[76] Inventor: Zudora B. Snead, 736 N. E. 19th Street, Oklahoma City, Okla. 73105

[22] Filed: Aug. 24, 1971

[21] Appl. No.: 174,409

[52] U.S. Cl. ................................................... 17/70
[51] Int. Cl. ............................................. A22c 25/06
[58] Field of Search ....................................... 17/70

[56] References Cited

UNITED STATES PATENTS

| 1,962,570 | 6/1934 | Nelson et al. | 17/70 |
| 2,523,736 | 9/1950 | Swetlik | 17/70 |
| 1,632,194 | 6/1927 | Possehl | 17/70 |
| 3,248,751 | 5/1966 | Wilborn | 17/70 |
| 3,518,719 | 7/1970 | Anderson | 17/70 |
| 926,582 | 6/1909 | Meredith | 17/70 |

FOREIGN PATENTS OR APPLICATIONS

| 28,751 | 4/1918 | Norway | 17/70 |

Primary Examiner—Robert W. Michell
Assistant Examiner—John F. Pitrelli

[57] ABSTRACT

A fish-shaped mounting base of board or moulded plastic. Near the head of the fish-shaped base, a metal or plastic hook is attached loosely with a metal screw. The hook rotates on the screw to alternate positions. A large hole extends through the mounting base in the eye position of fish and serves as means for storing by hanging and means for anchorage while in use, when a spike or other holding device (ice pick, for instance) is placed through the hole into a stabilizing surface. A series of small holes are arranged in pairs and placed at regular intervals along the central axis of the mounting base. A four prong holding member is placed in the small holes with sharp points upward and exposed for holding the tail of a fish. A standard ruler stamped on reverse side of mounting base furnishes a convenient method of measure.

1 Claim, 6 Drawing Figures

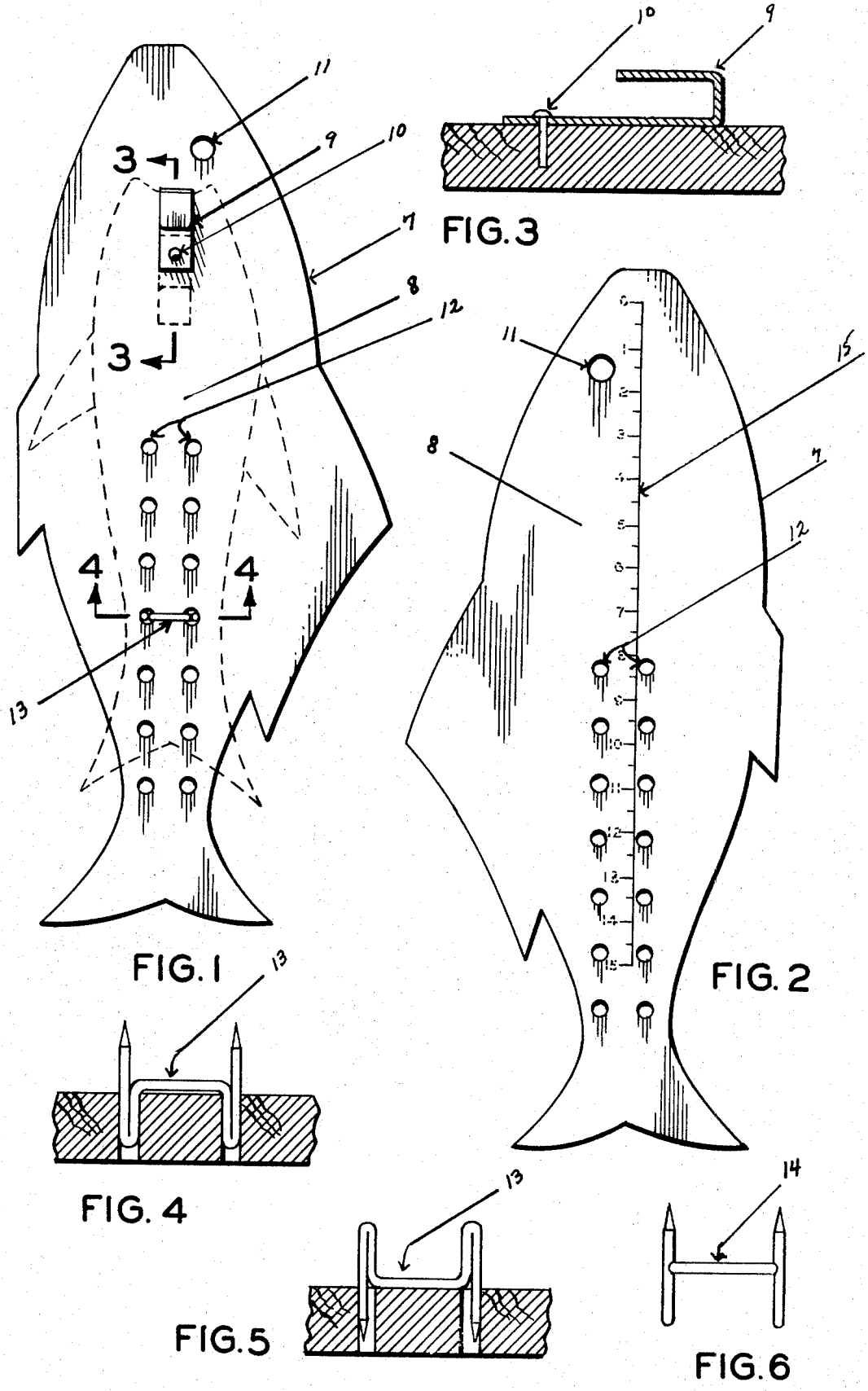

FISH HOLDER

SUMMARY

This invention relates to a holding device adapted for use in holding fish of various sizes for scaling and skinning catfish of limited sizes by holding them in a position to be operated upon.

This invention has for its objective the provision of a device for easily holding fish in position although the operator's hands are covered with scales and slime which heretofore has been a problem.

A further objective of the invention is to provide a fish holding device which is simple in construction, free from mechanical procedures and time consuming processes of engaging and un-engaging fish in stabilizing positions while providing an efficient holding function.

A further objective of the invention is to provide a light weight, and compact device that can be transported along with fishing gear and is available for effective use in any location where needed and is economical to obtain and maintain.

In the accompanying drawing, forming a part of this specification, similar characters of reference indicate corresponding parts in all views.

FIG. 1 is a top view of the fish holding device illustrating by dotted lines the relative position of a fish positioned thereon.

FIG. 2 is a bottom view of FIG. 1.

FIG. 3 is a fragmentary vertical cross-sectional view taken along line 3—3 of FIG. 1.

FIG. 4 is a fragmentary vertical cross-sectional view taken substantially along line 4—4 of FIG. 1, and shows the position of the prong member in use.

FIG. 5 is view similar to FIG. 4 illustrating the stored position of the prong member.

FIG. 6 is an elevated view of an alternative embodiment of the fish tail holding prong member.

While the fish holding device is simple, effective, not dependent upon any environmental or special use conditions, substantial numbers of the herein described embodiment have been made, tested and used and have performed satisfactorily.

The fish holding device of the invention designated by reference numeral 7, comprises an elongated, fish-shaped mounting base 8, of wood or plastic.

Near the fish head end section of the mounting base 8, a hook 9 which holds the head of a fish in place, is loosely attached with screw 10 so as to rotate to alternate positions making hook 9 adaptable for engaging the mouth of scale fish or gills of catfish. In the eye position of the fish-shaped base 8, is a large hole 11 with the functional feature of storing by hanging and anchorage when in use when a spike or other holding device such as ice pick (not shown) is placed through the hole into a stabilizing surface. Beginning 4 inches from screw 10, small holes 12 arranged in pairs extend along the central axis of the mounting base 8 spaced at regular intervals in continuous rows extending from the tail end of fish-shaped base 8.

The relation of holes 12 to reverse side of mounting base 8 is shown in FIG. 2.

Holding prong member 13 is placed in holes 12 and thereby holds the tail of fish when fish are pressed onto the prong sufficiently to hold but not completely through the fish thus enabling an operator to scrape scales completely to the end of the fish tail.

Placement of prong member 13 in suitably located holes 12 adapts the fish holding device to various sizes of fish for scaling but need not be used when skinning catfish, and has a safety feature in storage designated in FIG. 5.

Holding prong member designated by numeral 14, FIG. 6 is efficient but is of more difficult construction in some circumstances.

A standard ruler 15 stamped on reverse side of mounting base 8 functions as a convenient method of measure. (A ruler of diminishing inches not shown also stamped on reverse side of the mounting base is a novel addition making the device more attractive and interesting.)

It can be seen that I have provided a fish holding device that is highly portable, functions efficiently for scaling fish by engaging the mouth of fish with a hook, pressing the tail firmly on an appropriately placed prong member, scraping scales in outward direction from the operator with a knife or any scale scraping device, while holding the tail section of the fish holder with one hand and easily scraping scales with the other hand. Both sides of fish can be scaled by lifting fish from the mounting base and turning them on their reverse side and replacing them on the mounting base.

Also the device holds catfish efficiently by rotating the hook to an alternate position, placing it into the gills of catfish, and holding the fish while the skin is pulled inward toward the operator with pincers or any gripping device.

What is claimed is:
1. A fish holding device comprising:
   a. a fish-shaped elongated mounting base;
   b. a hook pivotalby secured at one end of said base for holding the head of a fish;
   c. a series of holes arranged in pairs and spaced at regular intervals extending from an end of said base opposite said one end along the central axis of said base, said holes providing for longitudinal adjustment for various size fish;
   d. a four prong H-shaped member, adapted to be inserted in said holes and mounted adjacent said other end, for engaging the tail of a fish;
   e. an enlarged opening, adjacent one end of said base for anchoring said device while in use, and
   f. indicia on the bottom surface of said base for aiding in the measurement of fish.

* * * * *